US005762413A

United States Patent [19]

Colucci et al.

[11] Patent Number: 5,762,413

[45] Date of Patent: Jun. 9, 1998

[54] TILTABLE HEMISPHERICAL OPTICAL PROJECTION SYSTEMS AND METHODS HAVING CONSTANT ANGULAR SEPARATION OF PROJECTED PIXELS

[75] Inventors: D'nardo Colucci, Durham; Richard W. Zobel, Jr., Raleigh; David T. Bennett, Chapel Hill; Raymond L. Idaszak, Apex, all of N.C.

[73] Assignee: Alternate Realities Corporation, Morrisville, N.C.

[21] Appl. No.: 593,699

[22] Filed: Jan. 29, 1996

[51] Int. Cl.$^6$ .......... G03B 21/14

[52] U.S. Cl. .......... 353/122; 353/69; 352/69

[58] Field of Search .......... 353/94, 79, 69; 352/69, 70, 71; 359/451

[56] References Cited

U.S. PATENT DOCUMENTS

| | | | |
|---|---|---|---|
| 3,904,289 | 9/1975 | Yager | 353/69 |
| 4,131,345 | 12/1978 | Carollo | 352/70 |
| 4,573,924 | 3/1986 | Nordberg | 434/20 |
| 4,588,382 | 5/1986 | Peters | 434/44 |
| 4,597,633 | 7/1986 | Fussell | 352/69 |
| 4,763,280 | 8/1988 | Robinson et al. | 364/518 |
| 4,964,718 | 10/1990 | Van Hoogstrate et al. | 353/31 |
| 5,004,331 | 4/1991 | Haseltine et al. | 350/443 |
| 5,023,725 | 6/1991 | McCutchen | 358/231 |
| 5,071,209 | 12/1991 | Chang et al. | 359/19 |
| 5,242,306 | 9/1993 | Fisher | 352/69 |
| 5,274,405 | 12/1993 | Webster | 351/158 |
| 5,281,960 | 1/1994 | Dwyer, III | 345/15 |
| 5,300,942 | 4/1994 | Dolgoff | 345/32 |
| 5,347,398 | 9/1994 | Debize | 359/648 |
| 5,394,198 | 2/1995 | Janow | 348/744 |
| 5,500,747 | 3/1996 | Tanide et al. | 353/79 |
| 5,601,353 | 2/1997 | Naimart et al. | 352/69 |

FOREIGN PATENT DOCUMENTS

| | | |
|---|---|---|
| 01106689 | 4/1989 | European Pat. Off. . |
| 01201693 | 8/1989 | European Pat. Off. . |
| 0 458 463 A1 | 11/1991 | European Pat. Off. . |
| 0 560 636 A1 | 9/1993 | European Pat. Off. . |
| 06202140 | 7/1994 | European Pat. Off. . |
| WO 91/07696 | 5/1991 | WIPO . |

OTHER PUBLICATIONS

PCT Search Report, PCT/US97/00588, Aug. 6, 1997.

Shafer, "Simple Method for Designing Lenses", SPIE, 1980 International Lens Design Conference, vol. 237, 1980, pp. 234–241 no month.

*Primary Examiner*—William Dowling

*Attorney, Agent, or Firm*—Myers Bigel Sibley & Sajovec

[57] ABSTRACT

An array of image pixels is projected into a hemispherical projection having constant angular separation among adjacent image pixels, so that the array of image pixels may be projected onto hemispherical surfaces of varying radii without requiring spatial distortion correction of the array of image pixels. The array of pixels is preferably projected radially from the center of a dome onto a spherical inner surface of the dome. The hemispherical projection may be tilted so that the array of pixels is projected onto one of a plurality of selectable positions on the inner dome surface. The projection system preferably includes at least three collimating lenses having a common ratio of index of refraction to dispersion. The projection system projects an array of image pixels from the image source into a hemispherical surface at a projection angle of at least 160 degrees, notwithstanding that the lenses are separated from the image by a separation distance which is at least six times the image size. Accordingly, hemispherical optical projection systems and methods are provided which can work with domes of many sizes and varying audience configurations, and which do not require spatial correction or color correction of the hemispherical image to be projected.

49 Claims, 3 Drawing Sheets

TILTABLE HEMISPHERICAL OPTICAL PROJECTION SYSTEMS AND METHODS HAVING CONSTANT ANGULAR SEPARATION OF PROJECTED PIXELS

FIELD OF THE INVENTION

This invention relates to optical projection systems and methods, and more particularly to hemispherical optical projection systems and methods.

BACKGROUND OF THE INVENTION

Hemispherical optical projection systems and methods, i.e. systems and methods which project images at an angle of at least about 160 degrees, are used to project images onto the inner surfaces of domes. Hemispherical optical projection systems and methods have long been used in planetariums, commercial and military flight simulators and hemispherical theaters such as OMNIMAX® theaters. With the present interest in virtual reality, hemispherical optical projection systems and methods have been investigated for projecting images which simulate a real environment. Such images are typically computer-generated multimedia images including video, but they may also be generated using film or other media. Home theater has also generated much interest, and hemispherical optical projection systems and methods are also being investigated for home theater applications.

Heretofore, hemispherical optical projection systems and methods have generally been designed for projecting in a large dome having a predetermined radius. The orientation of the hemispherical projection has also generally been fixed. For example, planetarium projections typically project vertically upward, while flight simulators and hemispherical theaters typically project at an oblique angle from vertical, based upon the audience seating configuration. Hemispherical optical projection systems and methods have also generally required elaborate color correction and spatial correction of the image to be projected, so as to be able to project a high quality image over a hemisphere.

Virtual reality, home theater and other low cost applications generally require flexible hemispherical optical projection systems and methods which can project images onto different size domes and for different audience configurations. The optical projection systems and methods should also project with low optical distortion over a wide field of view, preferably at least about 160 degrees. Minimal color correction and spatial correction of the image to be projected should be required.

SUMMARY OF THE INVENTION

It is therefore an object of the present invention to provide improved hemispherical projection systems and methods.

It is another object of the present invention to provide hemispherical projection systems and methods which can project onto domes of many sizes.

It is yet another object of the present invention to provide hemispherical projection systems and methods which can be adapted for different audience configurations, such as planetarium and theater.

It is still another object of the present invention to provide hemispherical optical projection systems and methods which do not require color correction of the image to be projected.

It is still a further object of the present invention to provide hemispherical projection systems and methods which do not require spatial correction of the image to be projected.

These and other objects are provided, according to the present invention, by a hemispherical projection system including at least one image source comprising an array of image pixels, and constant angular separation hemispherical projecting means for projecting the array of image pixels onto a hemispherical projection having constant angular separation among adjacent pixels. For example, for a circular array of image pixels having a diameter of 768 pixels, a constant angular separation of 13.7 arcminutes among adjacent pixels will provide 175 degree full field of view. Accordingly, the hemispherical optical projection system projects the array of pixels onto hemispherical surfaces of varying radii without requiring spatial distortion correction of the image to be projected. The hemispherical optical projection system accordingly can be used with domes of varying radius, such as from 4 to 8 meters, without requiring spatial distortion correction of the image to be projected. The constant angular separation hemispherical projecting means is preferably mounted at the center of the inner dome surface, so as to radially project the array of pixels onto the inner dome surface with constant angular separation among adjacent pixels.

In order to accommodate differing audience configurations, such as planetarium and theater, the hemispherical optical projection system also includes means for tilting the hemispherical projection having constant angular separation among adjacent pixels. Accordingly, the constant angular separation hemispherical projecting means projects the array of pixels onto a plurality of selectable positions on the inner dome surface. For example, the hemispherical projection may be tiltable over a range of 45 degrees from vertical. Tiltable hemispherical projection is preferably provided by pivotally mounting the hemispherical optical projection system. Alternatively, only some components of the hemispherical optical projection system may be pivotally mounted. In yet another alternative, a hemispherical optical projection system may be fixedly mounted and a movable mirror, lens or other elements may redirect the hemispherical projection. Accordingly, the same optical system can be used for planetarium style and theater style projections.

A hemispherical optical projection system according to the present invention preferably includes at least one source of high intensity linearly polarized light which projects polarized light along a light path. An image source includes an array of image pixels. A liquid crystal layer light valve array is included in the light path and is responsive to the image source to selectably rotate the polarization of the high intensity polarized light in the light path in response to the intensity of the image pixels. A polarizing filter is also included in the light path, downstream of the liquid crystal layer, for attenuating light as a function of polarization. A lens assembly is also included in the light path downstream of the polarizing filter to project light from the polarizing filter onto a hemispherical surface at a projection angle of at least about 160 degrees.

The lens assembly preferably includes a collimating lens assembly in the light path downstream of the polarizing filter, and a meniscus lens assembly in the light path downstream of the collimating lens assembly to project the collimated light into an angular projection of at least about 160 degrees. The collimating lens assembly preferably includes at least three lens arranged along the optical path, each of the lenses including an index of refraction and dispersion. Each of the three lenses has a common ratio of index of refraction to dispersion. This common ratio of index of refraction to index of dispersion reduces or eliminates the need for color correction of the projected image in the hemispherical optical projection system.

In a preferred embodiment of the hemispherical optical projection system, a light valve is used to provide red, green and blue light sources which project light along respective red, green and blue light paths. Each light source may be formed from a common high intensity lamp and red, green and/or blue notch filters to separate the required colors into red, green and blue light paths. First, second and third linear polarizing beam splitters are included in the respective red, green and blue light paths. The first, second and third polarizing beam splitters direct red, green and blue light respectively onto first, second and third liquid crystal layers.

The light valve also includes first, second and third image sources, such as cathode ray tubes, field emitter arrays or other image sources, which project respective red, green and blue images onto the first, second and third liquid crystal layers, such that the first, second and third liquid crystal layers selectively rotate the polarization vector of the polarized light impinging thereon as a function of the intensity of the projected image which is projected thereon. The selectively rotated red, green and blue light which emerges from the first, second and third liquid crystal layers are then combined into a combined light path, for example using the polarizing beam splitters and additional notch filters. The lens assembly including the collimating lens assembly and meniscus lens assembly described above, is placed in the combined light path to project light from the polarizing filter onto a hemispherical surface at a projection angle of at least about 160 degrees.

The hemispherical optical projection system described above may require the lens assembly to be spaced apart from the image source by a separation distance which is at least six times the image size (for example the image diameter), in order to accommodate the polarizing beam splitters, notch filters and other optical elements for the individual red, green and blue light paths. Nonetheless, the lens assembly projects the array of image pixels from the image source onto a hemispherical surface at a projection angle of at least about 160 degrees, notwithstanding that the lens is separated by a separation distance which is at least six times the image size.

Hemispherical optical projection methods according to the invention include the step of projecting an array of image pixels into a hemispherical projection having constant angular separation among adjacent image pixels, such that the array of image pixels may be projected onto hemispherical surfaces of varying radii without requiring spatial distortion correction of the image to be projected. Preferably, the array of pixels is projected radially from the center of the dome onto a spherical inner surface of the dome. The projection also preferably may be tilted such that the array of pixels is projected onto one of a plurality of selectable positions on the inner dome surface. Projection preferably takes place by projecting polarized light along a light path, selectively rotating the polarization of the polarized light in response to intensity of an array of image pixels, attenuating the selectively rotated light as a function of its polarization and projecting the attenuated light onto a hemispherical surface at a projection angle of at least about 160 degrees.

It will be understood by those having skill in the art that various aspects of the invention may be used individually in hemispherical optical projection systems and methods. For example, the constant angular separation hemispherical projection, the lens assembly which is spaced apart from the image source by a separation distance which is at least six times the image size, the tiltable hemispherical optical projection, the collimating lens having common ratio of index of refraction to dispersion and the optical projection system and method including light valve arrays may each be used individually in hemispherical optical projection systems and methods. However, preferably, two or more of these aspects are used together and, most preferably, all of these aspects are used together to provide hemispherical optical projection systems and methods which can work with domes of many sizes and varying audience configurations and which do not require spatial correction or color correction of the image to be projected, in order to project high quality hemispherical images for virtual reality, home theater and other applications.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
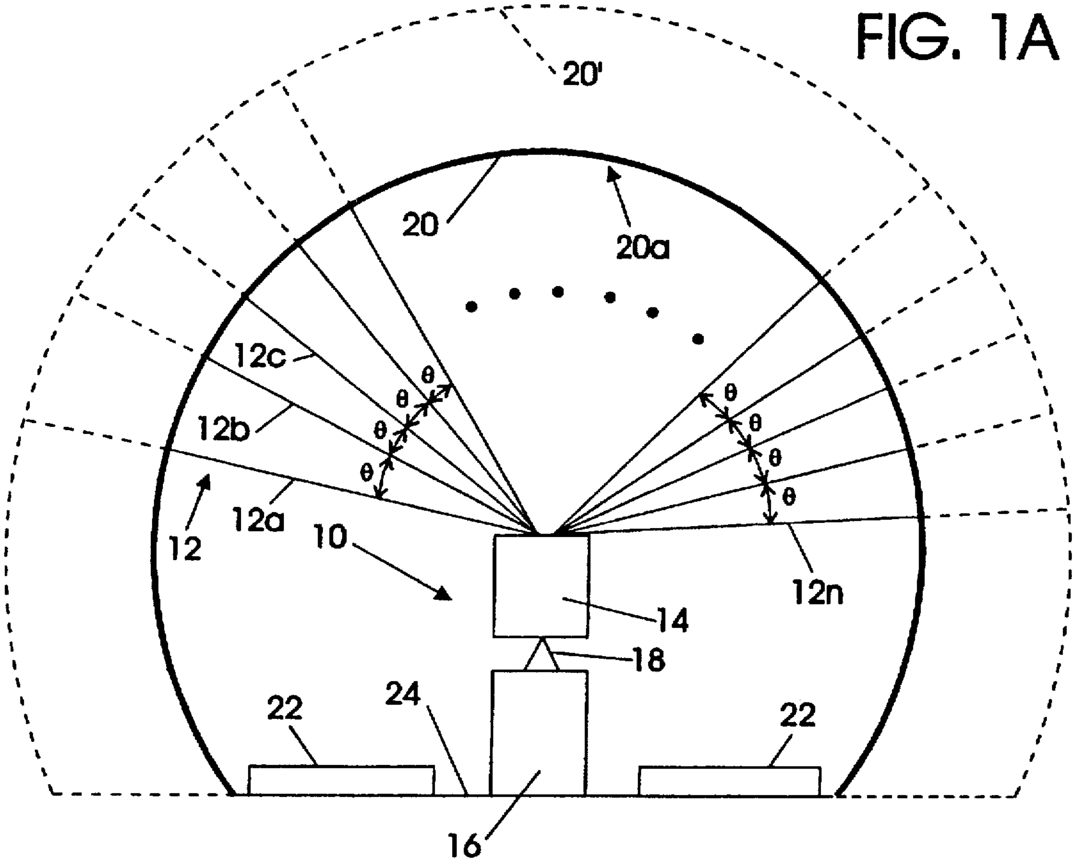
FIGS. 1A and 1B are block diagrams illustrating he spherical optical projection systems and methods according to the present invention.
Figure 1B:
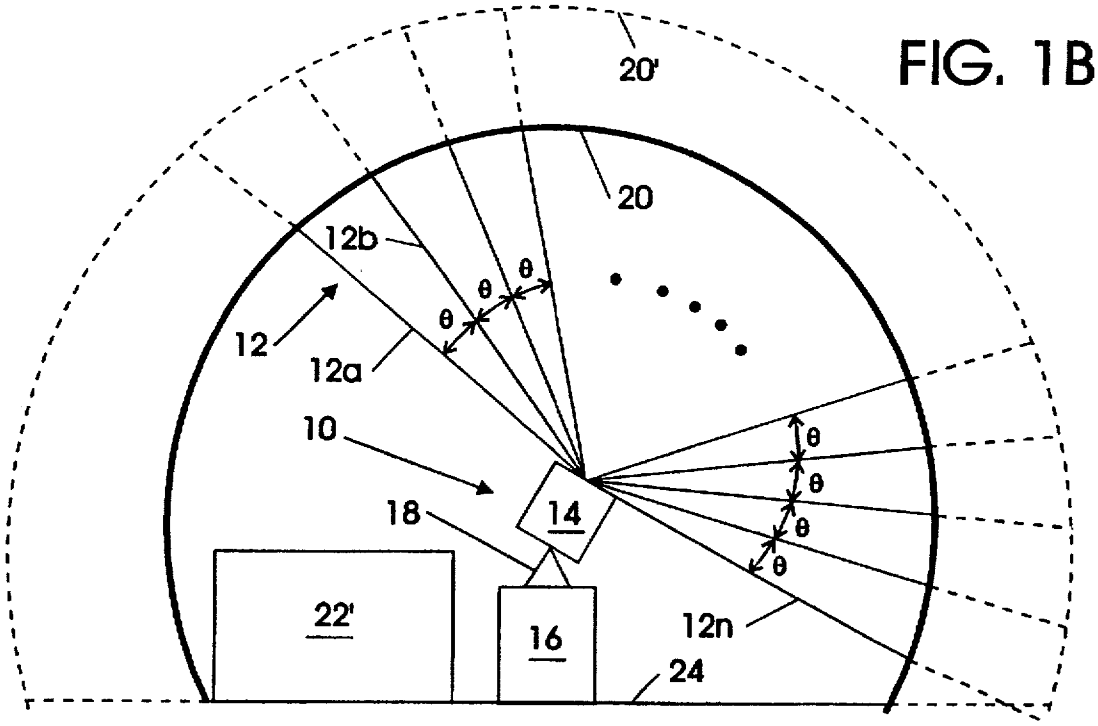

Referring now to FIGS. 1A and 1B, a tiltable hemispherical optical projection system having constant angular separation of projected pixels according to the present invention is described. Hemispherical optical projection system 10 projects a hemispherical projection 12 having constant angular separation among adjacent pixels as indicated by angle θ which is constant among adjacent pixels **12*a*–12*n*. For example, a circular array of 768 pixels may be projected at a constant angular separation of 13.7 arcminutes at 175 degree full field of view. Hemispherical optical projection system 10 projects the hemispherical projection having constant angular separation onto the inner surface 20*a* of truncated hemispherical dome 20**.

The constant angular separation hemispherical optical projection system may be regarded as an "inverse telephoto" system having an f·θ lens. The image height is proportional to f·θ, where f is the focal length of the lens and θ is the constant angular separation among adjacent pixels.

By maintaining constant angular separation among adjacent pixels, a low distortion image can be projected by hemispherical optical projection system 10 onto domes of varying radii, shown by 20'. For example, domes of radii from 4 to 8 meters may be accommodated. In order to maintain low distortion with constant angle of separation, hemispherical optical projection system 10 is preferably mounted at the center of the inner dome surface **20*a*** so as to radially project the array of pixels onto the inner dome surface.

Still referring to FIGS. 1A and 1B, the hemispherical optical projection system 10 includes means for tilting the hemispherical projection 12 having a constant angular separation among adjacent pixels, so that the constant angular separation hemispherical projecting means 10 projects the array of pixels onto a plurality of selectable positions on the inner dome surface 20*a*. For example, as shown in FIGS. 1A and 1B, projecting optics 14 may be pivotally mounted on base 16 using pivot 18. Base 16 is located on the floor 24 of dome 20. Pivot 18 may allow pivoting within a plane or in multiple planes. The design of pivot 18 is known to those skilled in the art and need not be described further herein.

By incorporating tilting means, the optical projection system can project vertically upward in a planetarium projection as shown in FIG. 1A or may project at an angle (for example 45 degrees) from vertical in a theater projection position, as shown in FIG. 1B. Typically, when projecting in a planetarium style, as shown in FIG. 1A, the audience area 22 surrounds the projection system 10. In contrast, when projecting theater style, the audience area 22' is typically behind the optical projection system 10 and the audience area 22' is raised so the audience can see the entire field of view in front of them. Thus, different audience configurations are accommodated.

Dome 20 is preferably constructed for portability and ease of assembly and disassembly. A preferred construction for dome 20 is described in copending application Ser. No. 08/593,041 to Zobel, Jr., et al. filed concurrently herewith entitled "Multi-Pieced, Portable Projection Dome and Method of Assembling the Same" and assigned to the assignee of the present application, the disclosure of which is hereby incorporated herein by reference.

Figure 2:
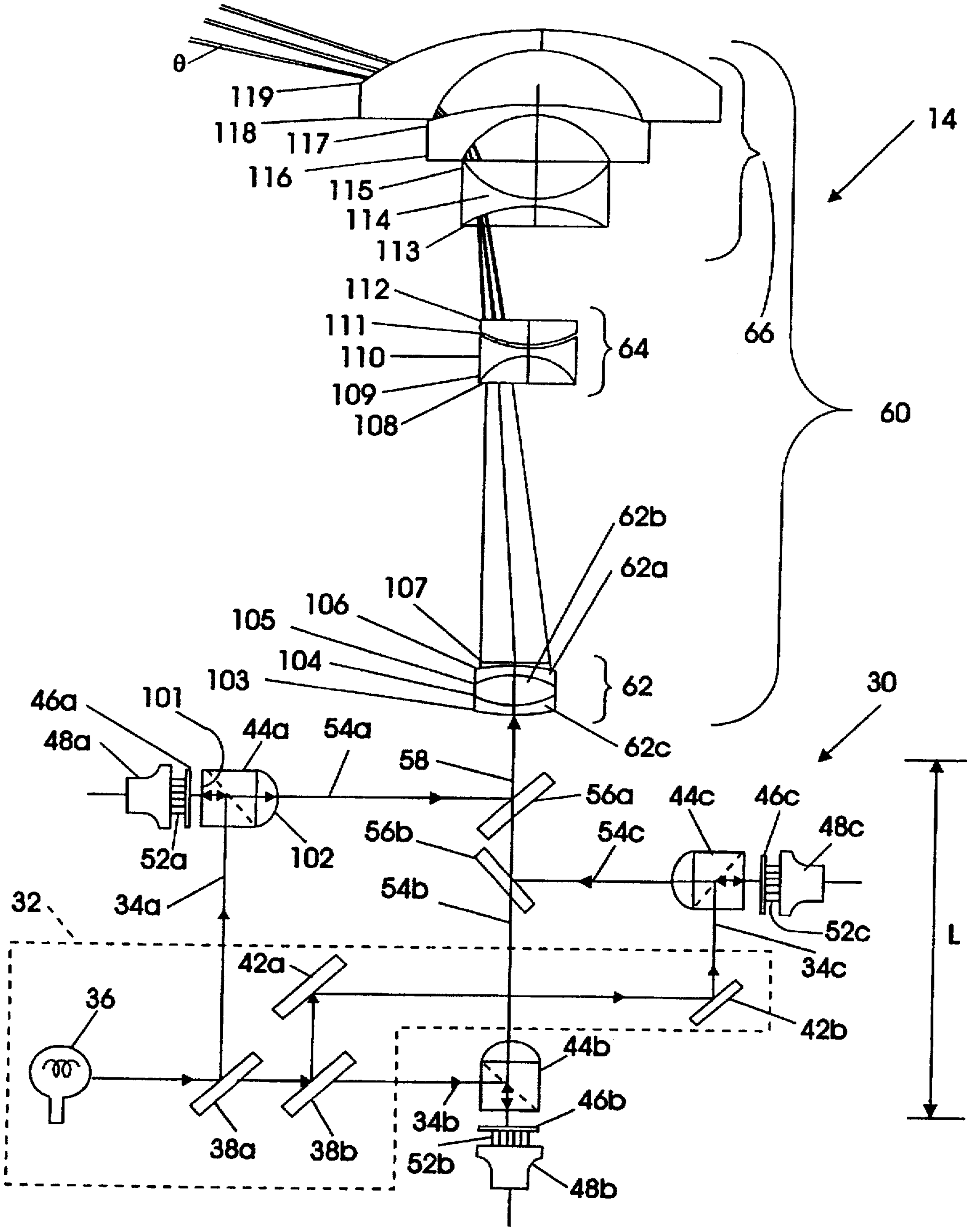
FIG. 2 is a schematic block diagram representation of the projecting optics of FIGS. 1A and 1B.

Referring now to FIG. 2, a schematic representation of projecting optics 14 is shown. Although projecting optics 14 may include a single light path for projecting gray scale images and may also include a single light path for projecting color images, a preferred embodiment uses separate red, green and blue light paths which are combined and projected, as will be described below.

Projecting optics 14 generally includes a light valve 30 and a projecting lens assembly 60. Light valve 30 may be an AMPRO Model 7200G light valve array.

Light valve 30 includes a light source 32 for providing high intensity red, green and blue light along respective red, green and blue light paths 34*a*, 34*b* and 34*c*. As shown in FIG. 2, light source 32 includes a high intensity source of light such as arc lamp 36 and red and green notch filters 38*a* and 38*b* respectively, to reflect one color only. One or more mirrors 42*a*, 42*b* are used to reflect the light into the appropriate light paths as necessary. It will be understood that separate monochromatic sources may also be used, rather than a single polychromatic (white) source and notch filters.

Continuing with the description of FIG. 2, light valve 30 includes three polarizing beam splitters 44*a*, 44*b* and 44*c* respectively in the red, green and blue light paths 34*a*, 34*b* and 34*c* respectively. The polarizing beam splitter 44a-44*c* reflects light which is linearly polarized orthogonal to the plane of FIG. 2 and transmits light which is linearly polarized in the plane of FIG. 2. Accordingly, light which is linearly polarized orthogonal to the plane of FIG. 2 is reflected from the respective polarizing beam splitter 44*a*, 44*b*, 44*c* to the respective liquid crystal layer 46*a*, 46*b*, 46*c*.

As is well known to those having skill in the art, the liquid crystal layers 46*a*–46*c* generally include an unrestricted, non-pixillated layer of nematic liquid crystal which is capable of rotating the polarization vector of light incident thereon by an amount determined by an image which is projected onto the liquid crystal layer 46*a*, 46*b*, 46*c*. Image sources 48*a*, 48*b*, 48*c* project an array of image pixels 52*a*, 52*b*, 52*c* onto the respective liquid crystal layer 46*a*, 46*b*, 46*c*. Image sources 48*a*, 48*b*, 48*c* may be a cathode ray tube, a field emitter array or any other two dimensional image array. As shown, the array of pixels from the image includes a predetermined height and predetermined width.

Accordingly, the light 54*a*, 54*b*, 54*c* which emerges from polarizing beam splitters 44*a*, 44*b*, 44*c* respectively, includes pixels having a polarization vector which is selectively rotated as a function of the intensity of the projected image on the corresponding liquid crystal layer 46*a*, 46*b*, 46*c*. For example, a dark pixel on the liquid crystal layer 46 causes zero degrees of polarization rotation, while the brightest pixel causes ninety degrees of rotation.

A second set of notch filters 56*a*, 56*b* acts as combining means for combining the separate red, green and blue light 54*a*, 54*b*, 54*c* into a single combined light path 58. The combined light path enters a lens assembly 60 which projects light onto a hemispherical surface at a projection angle of at least 160 degrees and at constant angular separation θ (e.g. 13.7 arcminutes) between adjacent pixels.

Still referring to FIG. 2, lens assembly 60 includes three elements: a collimating lens assembly 62, a wavefront shaping lens assembly 64 and a meniscus lens assembly 66.

Figure 3:
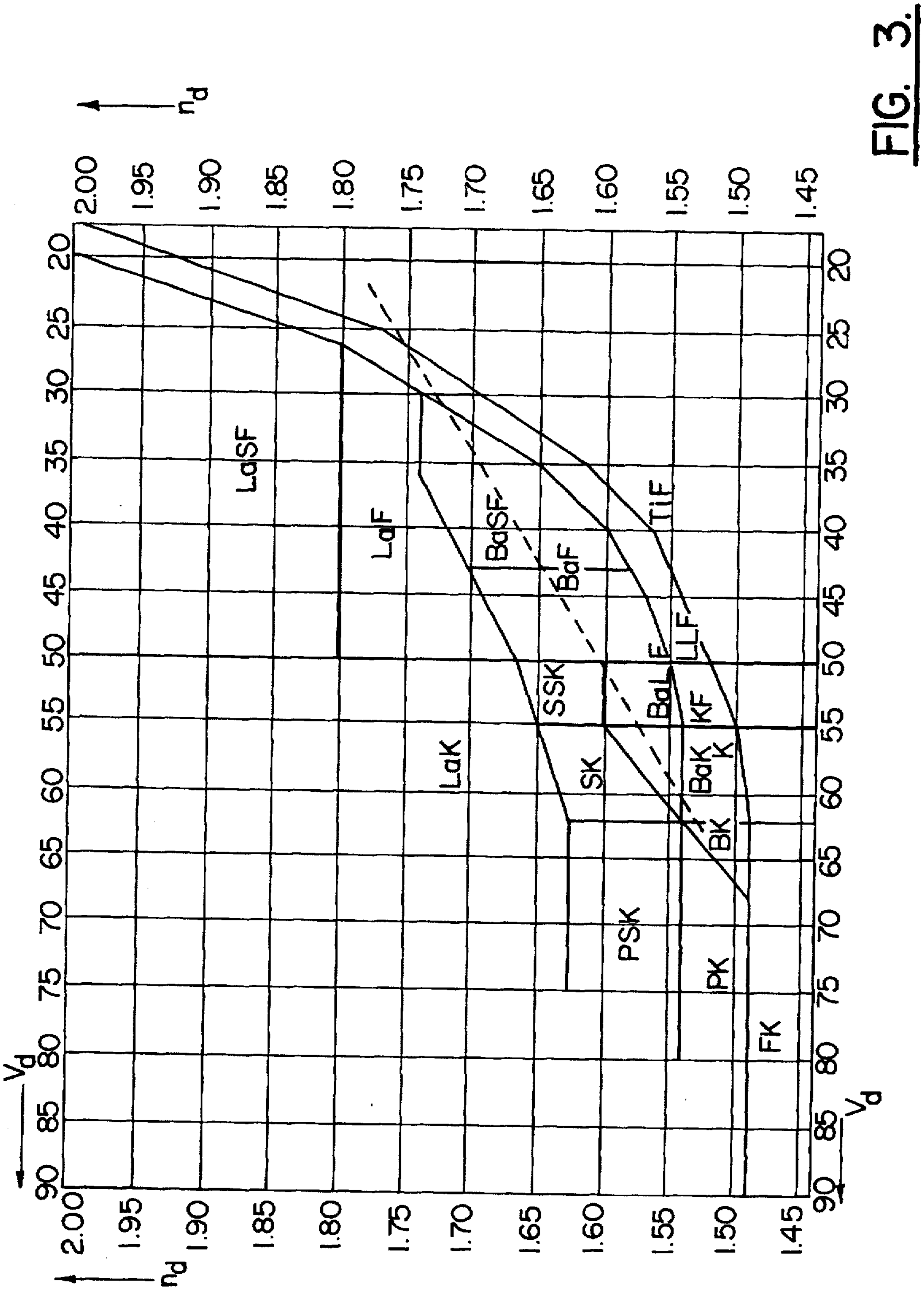
FIG. 3 graphically illustrates index of refraction versus dispersion for lenses according to the present invention.

Collimating lens assembly includes at least three collimating lenses 62*a*, 62*b*, 62*c*. Each collimating lens includes an index of refraction and a dispersion. Each of the collimating lenses has a common ratio of index of refraction to dispersion. Stated differently, all three lenses lie on a common line when plotted on an index of refraction versus dispersion graph, as illustrated in FIG. 3. Lenses 62*a* and 62*c* are relatively high index and low dispersion glasses (SF4 and BASF10) respectively. Lens 62*b* is a low index, high dispersion glass (BAK4). The outer glasses 62*a* and 62*c* preferably closely match those specified in a paper by Shafer entitled "Simple Method for Designing Lenses", Proceedings of the SPIE, Volume 237, pages 234–241, 1980, for using concentric and aplanatic surfaces to minimize field aberrations. Table I illustrates the performance of the collimating lenses 62*a*–62*c*. The surfaces are labeled in FIG. 2.

TABLE I

| Surface | SPHA | COMA | ASTI | FCUR | DIST | CLA | CTR |
|---|---|---|---|---|---|---|---|
| 103 | 0.19905 | −0.05074 | 0.01293 | 0.01930 | −0.00822 | −0.10168 | 0.02592 |
| 104 | −0.14528 | 0.01565 | −0.00169 | −0.00552 | 0.00078 | 0.11196 | −0.01206 |
| 105 | −0.14321 | −0.02453 | −0.00420 | −0.00323 | −0.00127 | 0.05596 | 0.00959 |
| 106 | 0.12541 | 0.05146 | 0.02111 | 0.01544 | 0.01500 | −0.05722 | −0.02348 |
| Total | 0.03597 | −0.00816 | 0.02815 | 0.02599 | 0.00629 | 0.00902 | −0.00003 |

As shown, the lenses have low color aberration and modest coma and astigmatism. Glass choice allows good color correction while maintaining near concentric/aplanatic conditions on the first and last surfaces.

Wavefront shaping lens assembly 64 includes lenses to correct aberrations caused by meniscus lens assembly 66. In particular, the assembly 64 differentially affects wavefronts at different field points. Thus, on-axis field differential color correction and wavefront shaping is applied, compared to off-axis.

The meniscus lens assembly includes at least one meniscus lens. As known to those having skill in the art, a meniscus lens is a concavo-convex lens. The meniscus lens assembly 66 performs two functions. First, it diverges the light such that the angular separation between beams 12*a*–12*n* from adjacent pixels is nearly constant regardless of where the pixels are in the object plane. This reduces or eliminates unnatural distortion on the domed image. In particular, when the optical projection system 10 is mounted in the center of curvature of the dome, the angular separation may be maintained constant and thereby eliminate the need for distortion correction. If the optics are located off the dome center of curvature, the angular separation may need to vary to produce distortion-free images.

The meniscus lens assembly 66 also decreases the overall focal length of the system, thereby creating a very large depth of focus. Accordingly, the same lens assembly can be used across a wide range of dome sizes from about four meters to about eight meters. When combined with a constant angular separation between projected pixels, the same optical projection system may be used in all domes. Off-center curvature projection lens may have a large depth of focus, but their pixel angular separation generally must change with dome size.

In the optical projection system 14 described above, the need to place and align the optical components may require the lens assembly 60 to be spaced from the liquid crystal layer 46 more than in conventional projection lenses. In particular, as shown in FIG. 2, the distance L between the liquid crystal layer 46*b* and the first lens 62*c* in lens assembly 60 is more than six times the size of the image array 52*b*. Nonetheless, lens assembly projects the array of image pixels 12 from the image source 48 to a hemispherical surface at a projection angle of at least 160 degrees.

In order to further provide a complete description of the present invention, complete lens specifications for projecting lens assembly 60 is provided below. The surfaces are labelled in FIG. 2.

Surfaces: 25

Stop Surface: 107

System Aperture: Object Space Numerical Aperture

Apodization: Uniform, factor=0.000000

Effective Focal Length: 15.1415 (in air)

Effective Focal Length: 15.1415 (in image space)

Total Track (i.e. distance from image plane to object plane): 4325.92

Image Space F/#: 0.139349

Working F/#: 180.221

Object Space Numerical Aperture: 0.1

Stop Radius: 23.0427

Entrance Pupil Diameter: 108.659

Entrance Pupil Position: 538.573

Exit Pupil Diameter: 3.04199

Exit Pupil Position: -3646.38

Field Type: Object height in Millimeters

Primary Wave: 0.588000

Lens Units: Millimeters

Wavelengths: 3

| Channel | Value | Weight |
|---|---|---|
| 34a | 0.486000 | 1.000000 |
| 34b | 0.588000 | 1.000000 |
| 34c | 0.656000 | 1.000000 |

Fields: 3

Object Space: 0 mm 11 mm 22.86 mm

Image Space: 0° 43° 87.5°

A surface data summary is also provided in Table II below. The surfaces are identified in FIG. 2 at 102–119.

TABLE II

SURFACE DATA SUMMARY:

| Surface | Type | Radius | Thickness, mm | Glass | Diameter | Conic |
|---|---|---|---|---|---|---|
| Liquid crystal 46 | STANDARD | Infinity | 2 | | 0 | 0 |
| 101 | STANDARD | Infinity | 90 | BK7 | 80 | 0 |
| 102 | STANDARD | −220 | 200 | | 80 | 0 |
| 103 | STANDARD | 118.7 | 7 | SF4 | 53 | 0 |
| 104 | STANDARD | 67.6 | 19 | BAK4 | 53 | 0 |
| 105 | STANDARD | −53.357 | 6.2 | BASF10 | 53 | 0 |
| 106 | STANDARD | −135.36 | 3 | | 53 | 0 |
| 107-STOP | STANDARD | Infinity | 190.6115 | | 46.05922 | 0 |
| 108 | STANDARD | −310.083 | 16 | F2 | 61 | 0 |
| 109 | STANDARD | −39.12 | 5.5 | SK16 | 61 | 0 |
| 110 | STANDARD | 66.8 | 3.1 | | 61 | 0 |
| 111 | STANDARD | 74.22 | 13 | SF6 | 64 | 0 |
| 112 | STANDARD | 314.2 | 79.25666 | | 64 | 0 |
| 113 | STANDARD | −93.22 | 6 | SK16 | 93 | 0 |
| 114 | STANDARD | 60.77 | 22 | F2 | 93 | 0 |
| 115 | STANDARD | 548.2 | 33 | | 93 | 0 |
| 116 | STANDARD | −52.92 | 7 | SK16 | 96 | 0 |
| 117 | STANDARD | −216.18 | 36.25 | | 144 | 0 |
| 118 | STANDARD | −72.867 | 14 | SF6 | 136 | 0 |
| 119 | STANDARD | −206.2 | 3575 | | 234 | 0 |
| DOME SURFACE | STANDARD | Infinity | | | 0.002 | 0 |

TABLE II-continued

| SURFACE DATA SUMMARY: | | | | | | |
|---|---|---|---|---|---|---|
| Surface | Type | Radius | Thickness, mm | Glass | Diameter | Conic |
| 20a | | | | | | |

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A hemispherical optical projection system, comprising:

at least one image source comprising an array of image pixels; and means for projecting said array of image pixels into a hemispherical projection having constant angular separation among adjacent image pixels, such that said hemispherical optical projection system projects said array of image pixels onto hemispherical surfaces of varying radii without requiring spatial distortion correction of said array of image pixels.

2. A hemispherical optical projection system according to claim 1 wherein said at least one image source comprises at least one cathode ray tube.

3. A hemispherical optical projection system according to claim 1 wherein said at least one image source comprises at least one field emitter array.

4. A hemispherical optical projection system according to claim 1 further comprising:

a dome including a truncated spherical inner dome surface, said projecting means being mounted at the center of said dome to radially project said array of pixels onto said truncated spherical inner dome surface.

5. A hemispherical optical projection system according to claim 4 further comprising:

means for tilting said hemispherical projection having constant angular separation among adjacent pixels, such that said projecting means projects said array of pixels onto a plurality of selectable positions on said truncated spherical inner dome surface.

6. A hemispherical optical projection system according to claim 1 wherein said array of image pixels has an image size, and wherein said projecting means comprises:

a projection lens assembly which is spaced apart from said at least one image source by a separation distance which is at least six times said image size.

7. A hemispherical optical projection system comprising:

at least one image source having an image size, the image source comprising an array of image pixels; and a lens assembly which projects said array of image pixels from said image source onto a hemispherical surface at a projection angle of at least 160 degrees, said lens assembly being spaced apart from said at least one image source by a separation distance which is at least six times said image size.

8. A hemispherical optical projection system according to claim 7 wherein said at least one image source comprises at least one cathode ray tube.

9. A hemispherical optical projection system according to claim 7 wherein said at least one image source comprises at least one field emitter array.

10. A hemispherical optical projection system according to claim 7 further comprising:

a dome including a truncated spherical inner dome surface, said lens assembly being mounted at the center of said dome to radially project said array of pixels onto said truncated spherical inner dome surface.

11. A hemispherical optical projection system according to claim 7 further comprising:

means for tilting said lens assembly, such that said lens assembly projects said array of pixels onto a plurality of selectable positions on said truncated spherical inner dome surface.

12. A hemispherical optical projection system according to claim 11, wherein said lens assembly projects said array of image pixels into a hemispherical projection having constant angular separation among adjacent image pixels, such that said hemispherical optical projection system projects said array of image pixels onto hemispherical surfaces of varying radii without requiring spatial distortion correction of said array of image pixels.

13. A hemispherical optical projection system comprising:

at least one image source;

means for projecting images from said at least one image source onto a hemispherical surface at a projection angle of at least 160 degrees; and means for tilting at least part of said projecting means, such that said projecting means projects the images from said at least one image source in one of a plurality of selectable positions.

14. A hemispherical optical projection system according to claim 13:

wherein at least one image source has an image size the image source comprising an array of image pixels; and wherein said projecting means includes a lens assembly which projects said array of image pixels from said image source onto a hemispherical surface at a projection angle of at least 160 degrees, said lens assembly being spaced apart from said at least one image source by a separation distance which is at least six times said image size.

15. A hemispherical optical projection system according to claim 13 wherein said at least one image source comprises at least one cathode ray tube.

16. A hemispherical optical projection system according to claim 13 wherein said at least one image source comprises at least one field emitter array.

17. A hemispherical optical projection system according to claim 13 further comprising:

a dome including a truncated spherical inner dome surface, said projecting means being mounted at the center of said dome to radially project the images onto said inner dome surface.

18. A hemispherical optical projection system according to claim 13:

wherein said at least one image source comprises an array of image pixels; and wherein said projecting means projects said array of image pixels into a hemispherical projection having constant angular separation among adjacent image pixels, such that said hemispherical optical projection system projects said array of image pixels onto hemispherical surfaces of varying radii without requiring spatial distortion correction of said array of image pixels.

19. A hemispherical optical projection system comprising:

a source of high intensity polarized light which projects polarized light along a light path;

an image source including an array of image pixels;

a liquid crystal layer in said light path and responsive to said image source, to selectively rotate the polarization vector of said high intensity polarized light in said light path in response to intensity of the image pixels;

a polarizing filter in said light path, downstream of said liquid crystal layer, for attenuating light as a function of polarization; and a lens assembly in said light path downstream of said polarizing filter, and which projects light from said polarizing filter onto a hemispherical surface at a projection angle of at least 160 degrees.

20. A hemispherical optical projection system according to claim 19 wherein said source of polarized light comprises:

a high intensity source of unpolarized light; and means for directing said unpolarized light through said polarizing filter to said liquid crystal layer.

21. A hemispherical optical projection system according to claim 19 wherein said source of polarized light further comprises:

a notch filter which passes light of only one color.

22. A hemispherical optical projection system according to claim 19 wherein said lens assembly comprises: a collimating lens assembly in said light path downstream of said polarizing filter; and a meniscus lens assembly in said light path downstream of said collimating lens assembly, to project the collimated light into an angular projection of at least 160 degrees.

23. A hemispherical optical projection system according to claim 22 wherein said collimating lens assembly comprises at least three lenses arranged along said optical path, each of said lenses including an index of refraction and a dispersion, each of the three lenses having a common ratio of index of refraction to dispersion.

24. A hemispherical optical projection system, according to claim 19 wherein said lens assembly projects said array of image pixels into a hemispherical projection having constant angular separation among adjacent pixels, such that said hemispherical optical projection system projects said array of pixels onto hemispherical surfaces of varying radii without requiring spatial distortion correction of said array of image pixels.

25. A hemispherical optical projection system according to claim 19 wherein said at least one image source comprises at least one cathode ray tube.

26. A hemispherical optical projection system according to claim 19 wherein said at least one image source comprises at least one field emitter array.

27. A hemispherical optical projection system according to claim 19 further comprising:

a dome including a truncated spherical inner dome surface, said lens assembly being mounted at the center of said dome to radially project said array of pixels onto said truncated spherical inner dome surface.

28. A hemispherical optical projection system according to claim 19 further comprising:

means for tilting at least part of said lens assembly, such that said optical projection system projects said array of pixels onto a plurality of selectable positions on said inner dome surface.

29. A hemispherical optical projection system according to claim 19 wherein said array of image pixels has an image size, and wherein said lens assembly is spaced apart from said liquid crystal layer by a separation distance which is at least six times said image size.

30. A hemispherical optical projection system comprising:

red, green and blue light sources for projecting light along respective red, green and blue light paths;

first, second and third polarizing beam splitters in said respective red, green and blue light paths;

first, second and third liquid crystal layers, said first, second and third polarizing beam splitters directing red, green and blue light respectively, having a predetermined polarization, onto a respective first, second and third liquid crystal layer;

first, second and third image sources, for projecting respective red, green and blue images onto said first, second and third liquid crystal layers, such that said first, second and third liquid crystal layers selectively rotate polarization vectors of said polarized light impinging thereon as a function of the intensity of the projected image which is projected thereon;

means for combining the selectively rotated red, green and blue light which emerges from the first, second and third light liquid crystal layers into a combined light path; and a lens assembly in said combined light path, which projects light from said polarizing filter onto a hemispherical surface at a projection angle of at least 160 degrees.

31. A hemispherical optical projection system according to claim 30 wherein said red, green and blue light sources comprise:

a high intensity source of polychromatic light; and means for splitting said polychromatic light into said red, green and blue light sources.

32. A hemispherical optical projection system according to claim 30 wherein said lens assembly comprises:

a collimating lens assembly in said combined light path; and a meniscus lens assembly in said combined light path downstream of said collimating lens assembly, to project the collimated light into an angular projection of at least 160 degrees.

33. A hemispherical optical projection system according to claim 30 wherein said collimating lens assembly comprises at least three lenses arranged along said combined light path, each of said lenses including an index of refraction and a dispersion, each of the three lenses having a common ratio of index of refraction to dispersion.

34. A hemispherical optical projection system, according to claim 30 wherein said lens assembly projects image pixels into a hemispherical projection having constant angular separation among adjacent pixels, such that said hemispherical optical projection system projects said arrays of pixels onto hemispherical surfaces of varying radii without requiring spatial distortion correction of the image pixels.

35. A hemispherical optical projection system according to claim 30 wherein said first, second and third image sources comprise respective first, second and third cathode ray tubes.

36. A hemispherical optical projection system according to claim 30 wherein said first, second and third image sources comprise respective first, second and third field emitter arrays.

37. A hemispherical optical projection system according to claim 30 further comprising:

a dome including a truncated spherical inner dome surface, said lens assembly being mounted at the center of said dome to radially project said red, green and blue images onto said truncated spherical inner dome surface.

38. A hemispherical optical projection system according to claim 30 further comprising:

means for tilting at least part of said lens assembly, such that said optical projection system projects said red, green and blue images onto a plurality of selectable positions on said truncated spherical inner dome surface.

39. A hemispherical optical projection system according to claim 30 wherein said red, green and blue images have an image size, and wherein said lens assembly is spaced apart from said first, second and third light valve arrays by a separation distance which is at least six times said image size.

40. A hemispherical optical projection method comprising the steps of:

projecting polarized light along a light path;

selectively rotating the polarization of said polarized light in said light path in response to intensity of an array of image pixels;

attenuating the selectively rotated light as a function of its polarization; and projecting the attenuated light onto a hemispherical surface at a projection angle of at least 160 degrees.

41. A hemispherical optical projection method according to claim 40 wherein said step of projecting the attenuated light comprises the step of projecting the array of image pixels into a hemispherical projection having constant angular separation among adjacent pixels, such that said array of pixels may be projected onto hemispherical surfaces of varying radii without requiring spatial distortion correction of the array of image pixels.

42. A hemispherical optical projection method according to claim 40 wherein said step of projecting the attenuated light comprises the step of:

radially projecting said array of pixels onto an inner dome surface.

43. A hemispherical optical projection method according to claim 40 further comprising the step of:

tilting the projected attenuated light, such that said array of pixels may be projected onto a plurality of selectable positions on an inner dome surface.

44. A hemispherical optical projection method comprising the steps of:

projecting images from at least one image source onto one of a plurality of selectable positions on an inner dome surface, at a projection angle of at least 160 degrees.

45. A hemispherical optical projection method according to claim 44 wherein said projecting step further comprises the step of:

radially projecting the images onto the inner dome surface.

46. A hemispherical optical projection method according to claim 44 wherein said at least one image source comprises an array of image pixels; and wherein said projecting step comprises the step of projecting said array of image pixels into a hemispherical projection having constant angular separation among adjacent image pixels, such that said array of image pixels may be projected onto hemispherical surfaces of varying radii without requiring spatial distortion correction of the array of image pixels.

47. A hemispherical optical projection method comprising the step of:

projecting an array of image pixels into a hemispherical projection having constant angular separation among adjacent image pixels, such that said array of image pixels may be projected onto hemispherical surfaces of varying radii without requiring spatial distortion correction of the array of image pixels.

48. A hemispherical optical projection method according to claim 47 wherein said projecting step further comprises the step of:

radially projecting the array of pixels from the center of a dome onto a spherical inner surface of the dome.

49. A hemispherical optical projection method according to claim 48 wherein said projecting step is preceded by the step of:

tilting the hemispherical projection having constant angular separation among adjacent pixels, such that the array of pixels is projected onto one of a plurality of selectable positions on said inner dome surface.

* * * * *